Figure 1:
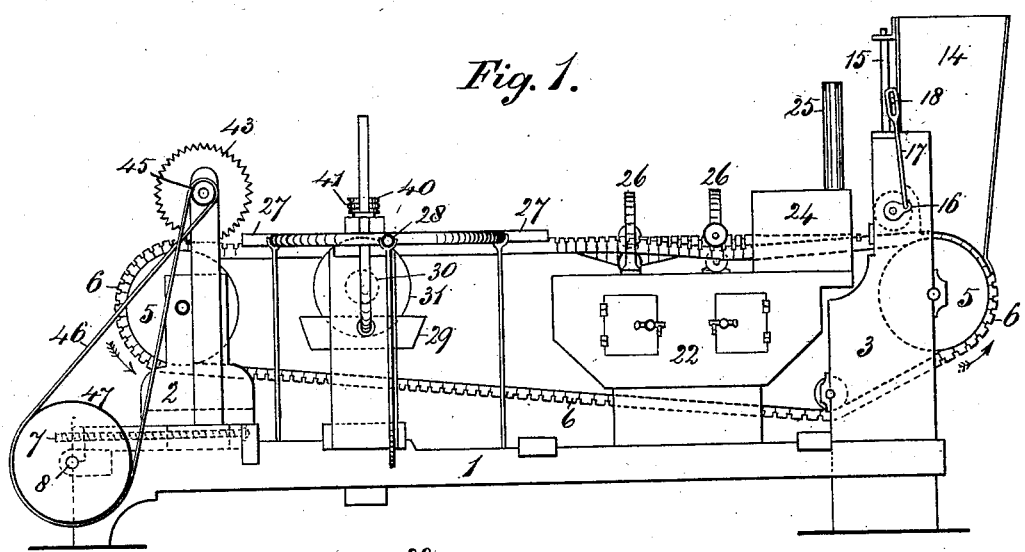

(No Model.)
2 Sheets—Sheet 1.

G. H. MILLEN, J. H. MANTION, F. LABELLE, & T. A. COOK.
APPARATUS FOR DIPPING MATCHES.

No. 280,650.
Patented July 3, 1883.

Witnesses:
John Grist.
H. H. Horsey.

Inventors:
G. H. Millen
J. H. Mantion
F. Labelle
T. A. Cook
By Henry Grist
Att'y (No Model.) 2 Sheets—Sheet 2.
G. H. MILLEN, J. H. MANTION, F. LABELLE, & T. A. COOK.
APPARATUS FOR DIPPING MATCHES.
No. 280,650. Patented July 3, 1883.
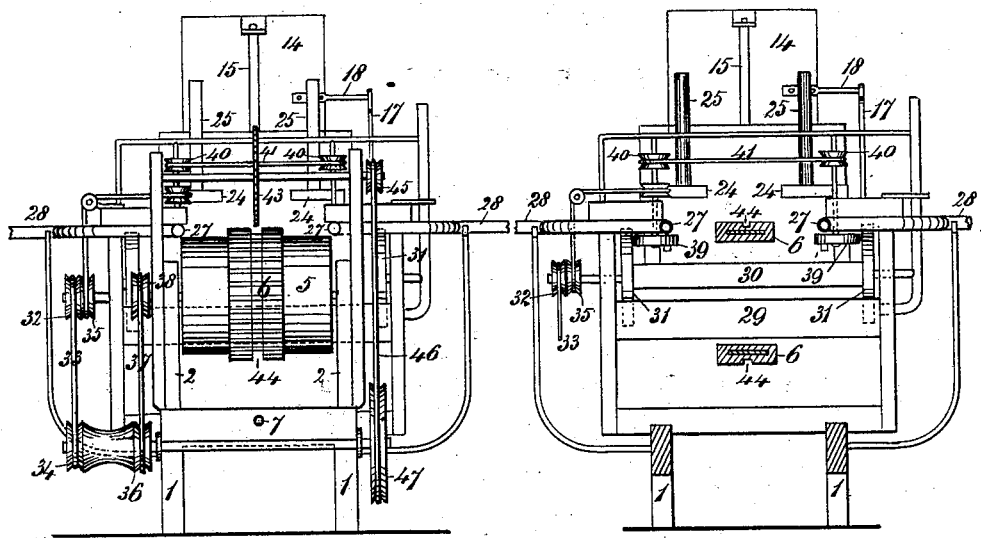
Fig. 3. Fig. 4.
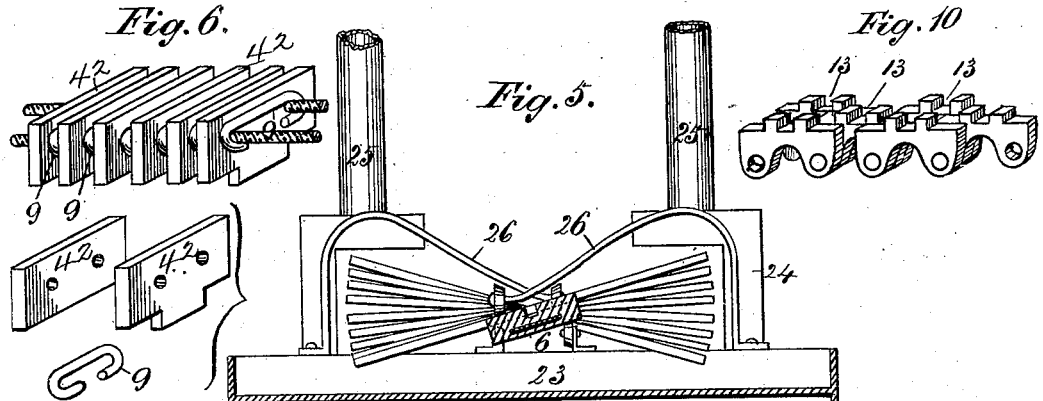
Fig. 6. Fig. 5. Fig. 10.
Fig. 7. Fig. 8. Fig. 9.
Witnesses:
John Grist
H. H. Horsey
Inventors.
G. H. Millen
J. H. Mantion
F. Labelle
T. A. Cook
By Henry Grist
Att'y.
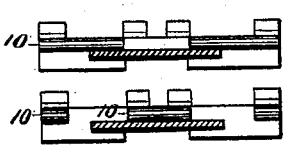

UNITED STATES PATENT OFFICE.

GEORGE H. MILLEN, JOSEPH H. MANTION, AND FELIX LABELLE, OF HULL, QUEBEC, AND THOMAS A. COOK, OF OTTAWA, ONTARIO, CANADA.

APPARATUS FOR DIPPING MATCHES.

SPECIFICATION forming part of Letters Patent No. 280,650, dated July 3, 1883.

Application filed October 2, 1882. (No model.)

*To all whom it may concern:*

Be it known that we, GEORGE H. MILLEN, JOSEPH H. MANTION, and FELIX LABELLE, all of Hull, in the county of Ottawa, in the Province of Quebec, Canada, and THOMAS A. COOK, of Ottawa, in the county of Carleton, in the Province of Ontario, Canada, have jointly invented certain new and useful Improvements in Apparatus for Sulphurizing and Phosphorizing Friction-Matches; and we do hereby declare that the following is a full, clear, and exact description of the same.

The object of this invention is to facilitate the sulphurization and phosphorization of match-splints in the manufacture of friction-matches, the splints being severally taken from a hopper, into which they are promiscuously placed, dried, sulphurized, cooled, phosphorized, cooled, and cut in two by a saw, the whole operation being consecutively performed in a continuous manner.

Our invention consists of a machine or apparatus driven by motive power, comprising a hopper into which the splints are promiscuously placed, an endless apron composed of a metal band having threaded thereon blocks cruciform in cross-section, and uniformly notched on their tops to adapt the same to receive and hold the splints, and running over a drum at the bottom of said hopper and over a drum at the opposite end of the machine, said chain or apron having joints which take a splint from the hopper and carry it forward to be dried, sulphurized, phosphorized, and cut in two to make two matches; a furnace contiguous to the hopper and intervening the bands of the apron or chain, said furnace having open chambers to dry the ends of the splints, and pans to hold the sulphur; arms to cant the apron to dip the ends of the splints into the sulphur; a cold-blast jet for cooling the sulphur on the ends of the splints; a phosphorizing-pan having rollers or wheels to take up the phosphorus and transfer it to the ends of the splints by contact therewith; a steam-pipe to keep the phosphorus liquid; a blast to cool the phosphorized ends of the splints, and a saw to cut the splints in the middle to make two matches, which fall from the machine ready to be packed for market.

Figure 2:
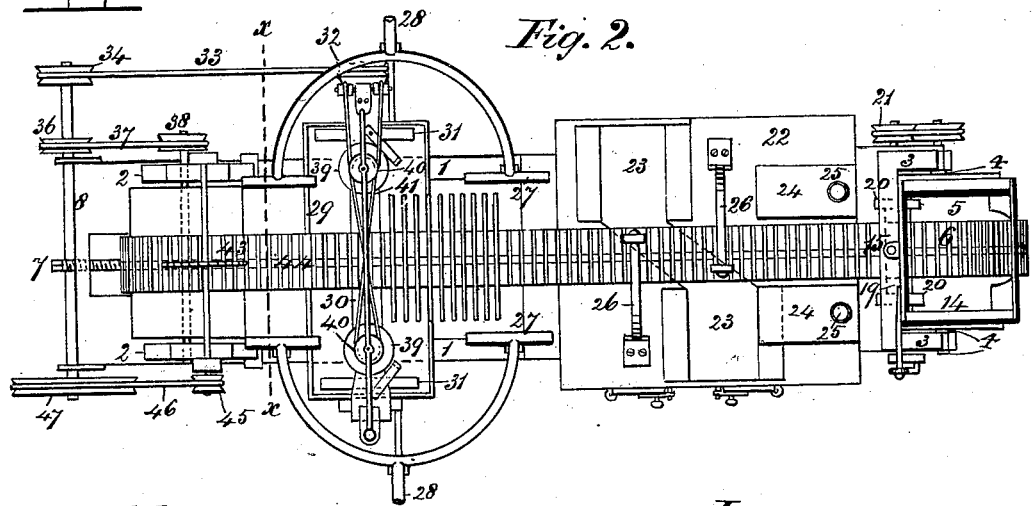

Figure 1 is a side elevation of our improved machine. Fig. 2 is a top view. Fig. 3 is an end view. Fig. 4 is a sectional elevation on line *x x*, Fig. 2. Fig. 5 is a partial view, enlarged, of the open drying-passages and the apron carrying the splints, canted by arms to dip the ends of the splints into the sulphur-pans. Fig. 6 is a perspective view of part of endless apron. Fig. 7 shows details of the parts detached. Fig. 8 shows a modification in constructing the apron. Fig. 9 shows another form or modification of the same. Fig. 10 shows a pitch-chain modification of the apron.

1 is the base of the apparatus or machine, if so built, having at one end a movable frame, 2, and at the other end a fixed frame, 3, both frames carrying on shafts 4 drums 5 5, over which passes an endless apron or chain, 6, the expansion and contraction regulated by screw 7 moving the adjusting-frame 2.

8 is the shaft to which the motive power is applied, and which is communicated through the machine by the endless apron, made of an endless band of thin steel, on which are threaded blocks cruciform in cross-section, each block uniformly notched out on the top, as shown in Fig. 8, the better to receive and hold the splints while traveling from one drum to the other, or by a pitch-chain, (shown in Fig. 10,) and which apron is made up of plates 42, strung on wire cables, or on a flexible band, and separated by an interposed plate or link, 9, as shown in Fig. 6, or formed with an offset, 10, as shown in Fig. 8, or blocks pintled together, having recesses 11 and projection 12, as shown in Fig. 9, or by a pitch-chain, as shown in Fig. 10, whereby channels 13 are formed across the apron or chain, each channel receiving a splint from the hopper, when passing thereunder, by the channels widening in passing over the drum and closing after passing its circumference, so that the splint is held firmly while being carried for the several operations, hereinafter described, until the other drum is reached, when the channels widen at top and free the splint or match, which drops into a suitable receptacle, ready to be packed for market.

14 is a hopper over one end of the endless apron, held loosely upon a post, 15, in a cross-head secured to the top of frame 3, said hopper agitated by an eccentric, 16, connecting-rod 17, and arm 18, fixed to the hopper, or by other suitable means, whereby the splints in the hopper will be compactly shaken together to be caught by the channels in the apron in passing over the drum.

19 is a roller with flanges 20, driven by a pulley, 21, from the drum-shaft, and which roller is placed in the exit-aperture of the hopper occupied by the apron, and above the same, to throw back the loose splints not taken up by the apron, and thus prevent the loose splints escaping from the hopper.

22 is a furnace seated on base 1, and occupying the space between the upper and lower ribbons of the apron, said furnace provided at top with pans 23 and open chambers or passages 24, connecting with flues 25. These chambers are clearly shown in Fig. 5, and consist of a broad flue vertically and horizontally projecting over the ends of the splints, whereby, in passing, the ends will be dried previous to passing arms 26, which cant the apron to alternate sides to dip the ends of the splints into the melted sulphur in pans 23, heated by the furnace. After passing from the sulphur-pans, the apron and splints recover a horizontal position and the ends of the splints pass in close proximity to perforated pipes 27, supplied by a fan connecting with inlet 28, whereby the blast of air will cool the sulphur previous to the ends of the splints being phosphorized, which is thus performed:

29 is a double-bottom pan to contain the phosphorizing compound, over which pan is mounted a cylinder, 30, having flanges 31 at each end, which take up the compound by the cylinder being revolved by pulley 32, belt 33, and pulley 34 on shaft 8, which is driven by pulley 36, belt 37, and pulley 38 on the shaft of drum 5. In contact with the inner face of flanges 31, horizontally with the apron, are journaled rollers 39, mounted on vertical shafts driven by pulleys 40 and crossed belts 41 from a pulley, 35, on the cylinder-shaft, or by any other suitable contrivance, whereby the phosphorus taken from the pan by the flanges will be communicated to the rollers and transferred to the ends of the splints by contact therewith during their passage between the said rollers while being carried onward by the apron. The pan, cylinder, flanges, and rollers are heated by suitable steam-pipes and hollow shaft to the cylinder. After thus being phosphorized, the ends of the splints pass in close proximity to perforated pipes 27, from whence a cold-air blast emanates, supplied from inlet 28 by a fan, as before described.

43 is a circular saw mounted above the apron, which has a channel, 44, in which the saw runs to cut the splints into two matches, which fall into a suitable receptacle. The saw-shaft is driven by pulley 45, belt 46, and pulley 47 on shaft 8.

We are aware that a machine for drying bobbins has been constructed with an endless apron composed of a flexible belt or band having mounted thereon a series of blocks having transverse channels, and which, during the rotation of said belt, open to receive and grip and finally discharge the bobbins, and such we do not claim; but we are not aware of any endless apron such as ours where cruciform blocks are threaded upon a metal band and have on their tops notches to adapt them to receive and hold match-splints.

We claim as our invention—

1. In a machine or apparatus for sulphurizing and phosphorizing match-splints, the combination of an endless apron or chain, 6, having transverse channels to pinch the splints, hopper 14 to feed the splints to the apron or chain, furnace 22, having chambers 24 to dry the ends of the splints, and pans 23 to contain the sulphur, arms 26 to cant the apron to depress the ends of the splints into the sulphur, blast-pipe 27 to cool the sulphurized ends of the splints, pan 29 to contain the phosphor, flanged cylinder 30, and rollers 39 to transfer the phosphorus to the ends of the splints, blast-pipes 27 to cool the phosphorized ends, and a saw, 43, to cut the splints transversely at the middle, the whole operating continuously, as set forth.

2. In a match-machine, an endless apron, 6, composed of a metal band having threaded thereon blocks cruciform in cross-section, and uniformly notched on their tops to adapt the same to receive and hold the splints, substantially as and for the purpose set forth.

3. The flexible apron or chain 6, composed of jointed sections forming channels to seize and relinquish the splints, in combination with drums 5 5, arms 26, hopper 14, and furnace 22, having pans 23, as and for the purpose described.

4. The flanged roller 19 at the outlet of the hopper 14, in combination with an endless apron or chain pinching the splints, as set forth, for the purpose herein described.

In testimony whereof we have signed our names to this specification in the presence of two subscribing witnesses.

GEO. H. MILLEN.
J. H. MANTION.
FELIX LABELLE.
T. A. COOK.

Witnesses:
HENRY GRIST,
JOHN GRIST.